June 27, 1967     I. K. DORTORT     3,328,665
VOLTAGE DIVIDER TRANSFORMER CONNECTION
Filed April 2, 1964     2 Sheets-Sheet 1
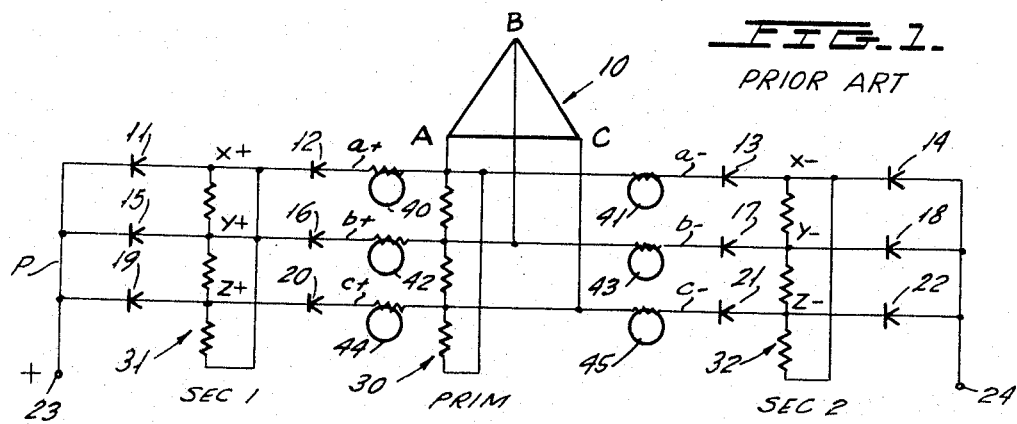
*FIG. 1.* PRIOR ART
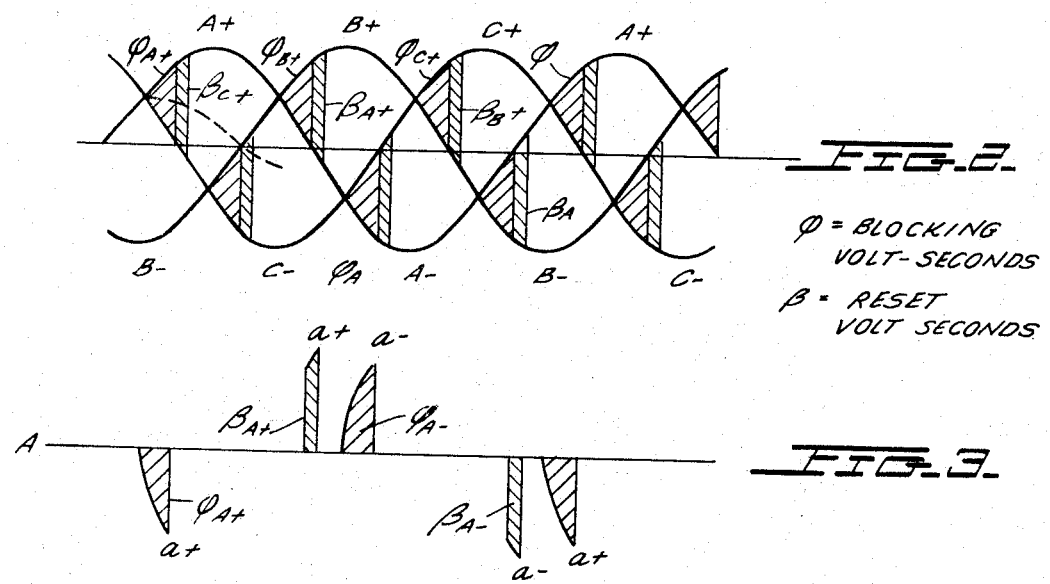
*FIG. 2.*
$\varphi$ = BLOCKING VOLT-SECONDS
$\beta$ = RESET VOLT SECONDS
*FIG. 3.*
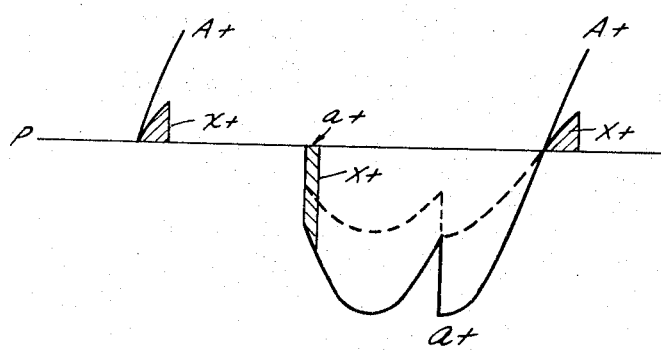
*FIG. 4.*
INVENTOR.
ISADORE K. DORTORT
BY
OSTROLENK, FABER, GERB & SOFFEN
ATTORNEYS

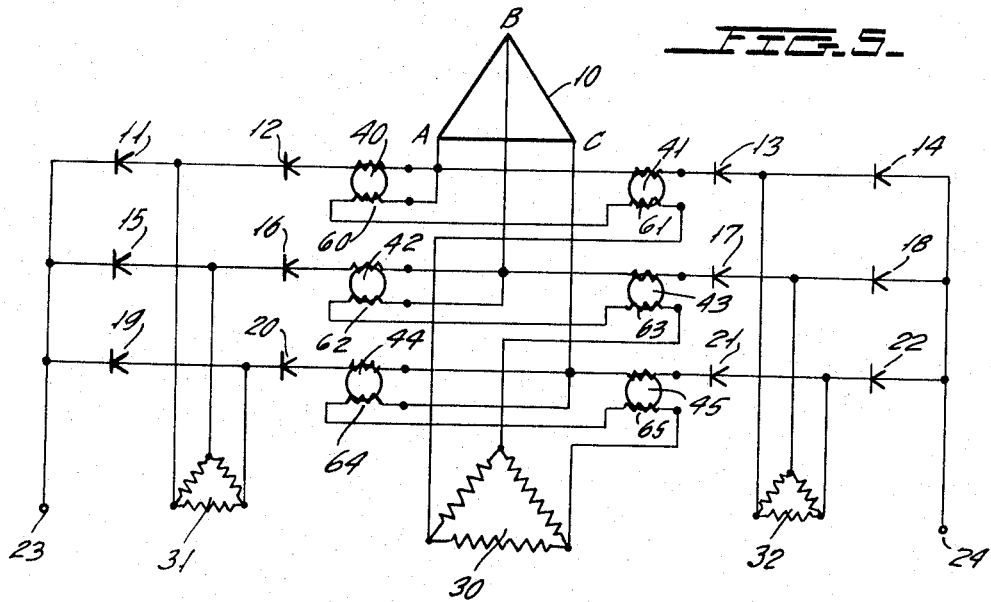
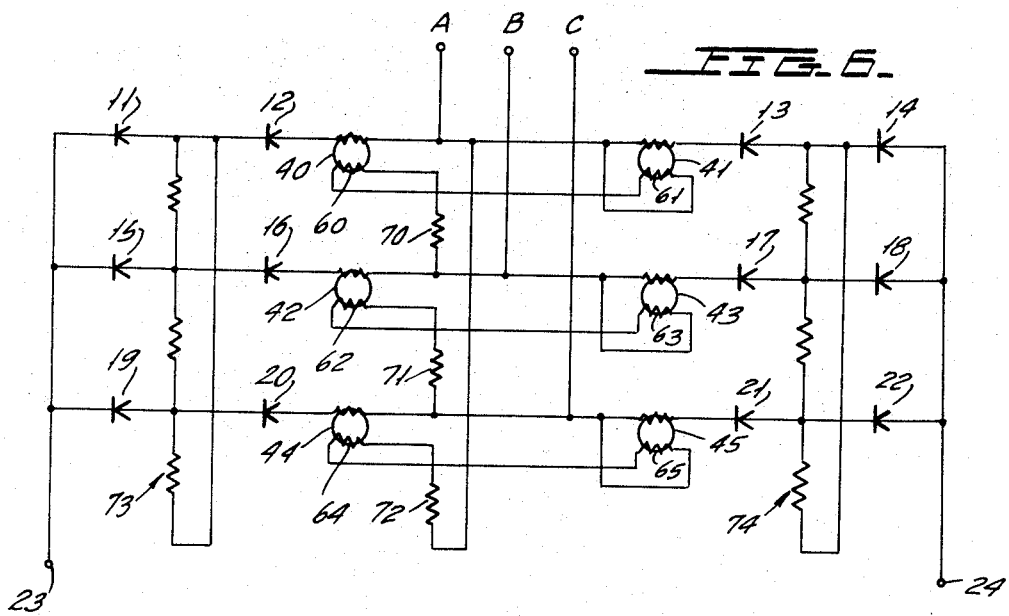

United States Patent Office 3,328,665
Patented June 27, 1967

3,328,665
VOLTAGE DIVIDER TRANSFORMER CONNECTION
Isadore K. Dortort, Philadelphia, Pa., assignor to I-T-E Circuit Breaker Company, Philadelphia, Pa., a corporation of Pennsylvania
Filed Apr. 2, 1964, Ser. No. 356,728
4 Claims. (Cl. 321—26)

This invention relates to a novel connection for a voltage divider transformer, and more particularly relates to a novel connection for a voltage divider transformer for rectifier circuits using self-saturating control reactors.

Voltage dividing transformer circuits for insuring equal distribution of voltage across a plurality of series connected diode elements is well-known to the art. Such devices as shown in U.S. Patent No. 2,932,781, entitled, "Semiconductor Protective Means," and assigned to the assignee of the present invention. Where the diode elements are connected in series with respective fuses, these transformers are made large enough to blow the fuse in case of a failure of the respective diode. That is to say, even though the normal current drawn from the transformer will be the relatively small reverse current of the diode elements, it must be sufficiently large to supply enough power to blow a diode fuse.

Since the voltage divider transformer is a relatively large element in the circuit, it is preferable in a rectifier circuit to have only a single voltage divider transformer having a single primary winding and a plurality of secondary windings which are connected to the various series connected diodes. However, when a single transformer of this type is used in connection with rectifier circuits having self-saturable control reactors, it has been found that during a portion of the operating cycle, an unusual effect occurs whereby the voltage divider transformer windings carry main load current, rather than its normally rated diode reverse current. Therefore, protective circuits associated with the voltage divider transformer have been opened, and the system removed from the line, even though a diode fuse has not been operated due to failure of the diode.

This unusual effect, which will be discussed more fully hereinafter, could be avoided by using two voltage divider transformers for each bridge of the rectifier circuit with the individual voltage divider transformer primaries connected between the control reactors and their respective diodes. As indicated previously, however, the voltage divider transformer is a large and expensive component so that this solution is preferably avoided.

The principle of the present invention is to provide a novel circuit for connecting the voltage divider transformer to a rectifier system which permits the use of a single voltage divider transformer for a rectifier circuit having control reactors in each arm of the circuit.

More particularly, and in accordance with the invention, the voltage divider transformer is connected in such a manner that the sinusoidal voltage applied to the primary winding of the voltage divider transformer will have the same amount of voltseconds removed therefrom as would be absorbed by the phase control reactors. Thus, in effect, the primary winding of the voltage divider transformer is connected between the phase control reactors and the first diodes of each of the arms of the bridge connection to thereby avoid passage of load current through the voltage divider transformer.

Accordingly, a primary object of this invention is to provide a novel connection for permitting the use of a single voltage divider transformer for a bridge connected rectifier circuit having controlled reactors associated with the arms of the bridge.

Another object of this invention is to provide a novel electrical circuit for the connection of a voltage divider transformer which eliminates the flow of load current through the voltage divider transformer windings.

These and other objects of this invention will become apparent from the following description when taken in connection with the drawings, in which:

FIGURE 1 is an electrical schematic diagram of a rectifier circuit using the well-known type connection for the voltage divider transformer particularly to illustrate the manner in which this connection permits load current flow through the voltage divider transformer windings.

FIGURE 2 illustrates voltage as a function of time for the circuit of FIGURE 1.

FIGURE 3 illustrates the voltage across the two reactors of the same phase in FIGURE 1 as a function of time, and is plotted to the same time scale as is FIGURE 2.

FIGURE 4 illustrates the inverse voltage across the diodes of one of the phases of FIGURE 1 as a function of time, and is plotted against the same time base as FIGURES 2 and 3.

FIGURE 5 illustrates the novel circuit of the present invention wherein load current flow through the voltage divider transformer is eliminated.

FIGURE 6 is a second embodiment of the invention.

Referring first to FIGURE 1, I have illustrated therein a typical rectifier circuit having a main transformer secondary winding 10 which is appropriately energized from a suitable multiphase power source, and is connected to the three-phase, full wave, bridge connected rectifier circuit which includes diodes 11 through 22. Note that each arm of the bridge connected circuit of FIGURE 1 has two series connected diodes. Thus, the positive phase A arm includes diodes 11 and 12, while the negative phase A arm includes diodes 13 and 14. In a similar manner, the positive and negative arms of phases B and C are formed of two series connected diodes. Clearly, any number of series connected diodes could be used for each of the arms of the bridge.

The output of the rectifier bridge is then connected to positive terminal 23 and negative terminal 24 in the usual manner.

As is fully described in my U.S. Patent No. 2,895,099, a voltage divider transformer can be connected to the rectifier circuit to insure an equal distribution of voltage across the series connected diodes. This voltage divider transformer includes multiphase primary winding 30 which is connected to secondary winding 10 in the manner illustrated.

A suitable magnetic structure is then provided (not shown) which receives primary winding 30 along with the two secondary windings 31 and 32, which are connected in the positive and negative sections respectively, as illustrated.

The operation of the voltage divider transformer is fully described in my above noted U.S. patent and need not be given in detail here, with the exception of noting that the secondary windings 31 and 32, in effect, provide an auxiliary source of reverse leakage current for their respective diodes, whereby the same voltage drop can be impressed across the diodes independently of their reverse current characteristics.

In order to provide control of the output voltage at terminals 23 and 24, it is well known to provide self-saturating control reactors in each arm of the bridge such as reactors 40 through 45 in FIGURE 1. Note that these reactors could form vernier control reactors in cooperation with a tap-changing means associated with secondary winding 10 or its primary winding, or a regulating transformer, in the manner set forth in my U.S. Patent 3,293,531, entitled, "Magnetic Vernier Control for Regulated Semiconductor Rectifier," and assigned to the assignee of the present invention.

The circuit illustrated in FIGURE 1 is one which a designer normally would choose when adding control reactors to the system. It has, however, been found that when the voltage dividing transformer is connected in this apparently logical manner, a circuit will be formed through the voltage divider transformer which causes it to carry load current. This could destroy the voltage divider transformer or, since the voltage divider transformer circuit is normally coupled with suitable control circuits for causing the rectifier system to be taken off the line upon the occurrence of an overload, would remove the system from the line.

More particularly, the voltage divider transformer frequently serves a second function which is to provide a sufficient amount of current to flow through a diode which has failed, thereby operating fuses associated with this diode. This connection is not shown herein, but is fully described in U.S. Patent No. 2,932,781.

Thus, while the normal current through the voltage divider transformer windings is of the order of milliamperes (the normal reverse current of the diodes), it must be capable of supplying a sufficient current to blow a fuse within one-half cycle. By way of example, the voltage divider transformer will normally carry currents of less than 50 milliamperes. However, since it is desired to permit the voltage divider transformer to supply a fuse blowing current responsive to the failure of an associated diode, the transformer is normally designed for a continuous current rating in the secondary windings of from 6 to 10 amperes with a very low impedance. This then enables the transformer to deliver up to 2,000 amperes for blowing a fuse in series with a failed diode.

As will be shown, with the circuit of FIGURE 1 and a load current of say 2,000 amperes, current through the secondary windings 31 and 32 could be as high as 2,000 amperes or approximately 200 times the current for which the transformer is designed. Obviously, the transformer would fail under these conditions.

It should be noted that this condition could be avoided by providing two separate voltage divider transformers, one for the positive phases and the other for the negative half of the bridge. This, however, is an expensive solution to the problem, since the voltage divider transformers are necessarily relatively large.

Turning now to FIGURES 2, 3 and 4, for an understanding of the problems presented by the connection of FIGURE 1, FIGURE 2 shows the potentials of the various labeled points in FIGURE 1 with respect to the virtual neutral of secondary winding 10. Thus, assuming that the impedance of the rectifier unit is very small, or that the load is small enough so that there is negligible distortion due to commutation, the voltage curves A, B and C are purely sinusoidal.

The positive envelope of these sinusoidal voltage curves defines the potential of positive terminal 23 of FIGURE 1 with respect to neutral, after subtracting the cross-hatched area $\phi_{A+}$, $\phi_{B+}$ and $\phi_{C+}$ which represent the voltseconds absorbed in the phase control reactors 40, 42 and 44, respectively. The areas $\beta_{A+}$, $\beta_{B+}$ and $\beta_{C+}$ represent the voltseconds generated by reactors 40, 42 and 44 during their flux-reset interval.

The potential of the negative terminal 24 is formed in the same manner whereby the wave shape of the D.C. voltage between terminals 23 and 24 will be the difference between the two envelopes in FIGURE 2.

During the interval covered by $\phi_{A+}$, it will be observed that phase C carries forward load current on the positive side of the bridge of FIGURE 1 which returns through the diodes in phase B on the negative side of the bridge. That is to say, there is current flow from the transformer winding 10 through diode 20, diode 19, terminal 23, through the load (not shown) to negative terminal 24, and thence to diodes 18 and 17, and then back to secondary winding 10. Therefore, point $z+$ between diodes 19 and 20 will be essentially at the same polarity as the positive bus (terminal 23) and anchors the voltage induced in the secondary portion of the voltage divider transformer which is connected between points $z+$ and $x+$.

Since this voltage is equal to ½ of the sinusoidal voltage impressed across the primary of the voltage divider transformer between phases A and C, the voltage of point $x+$ during the period $\phi_{A+}$ will be that shown in dotted lines in FIGURE 2, and as shown by the reduced cross-hatched area $x+$ in FIGURE 4. Therefore, during the interval covered by the cross-hatched area $x+$ of FIGURE 4, the point $x+$ in FIGURE 1 will be more positive than terminal 23 by the amount of the cross-hatched area $x+$ in FIGURE 4.

Since diode 11 connected between point $x+$ and terminal 23 cannot support a forward voltage in excess of, for example, 1.1 volts, a current must, therefore, flow through the diode 11 in its forward direction which puts the potential of point $x+$ at the same potential as point $z+$. That is to say, a single phase short circuit is established between these two points.

A current flow is, therefore, possible in the circuit of FIGURE 1. To understand this current flow, it should first be understood that the load current during this interval will flow from phase C of transformer 10 to the positive side of the bridge to point $c+$, point $z+$, terminal 23 through the load to terminal 24 to point $y-$, point $b-$, and thence to phase B of transformer 10. In other words, so long as there is a current flowing through the positive side of phase C, the point $z+$ will be at the same potential as terminal 23.

A short circuit current in the secondary winding 31 of the divider transformer will then take two paths. The first path is from point $z+$ downwardly through its secondary winding portion and up to point $x+$ through diode 11 to terminal 23, and in reverse direction from terminal 23 to point $z+$.

A second path similar to this first path is also formed through the other two phases of the rectifier system. This second path passes through points $z+$, $y+$, $x+$, forward through diode 11 and in reverse direction through diode 19 back to point $z+$. The current magnitude in this second path will be approximately ½ that of the first path mentioned above.

So long as the sum of the currents in these two paths is smaller than the load current, there will be forward current flowing in diode 19. Therefore, this short circuit current is limited in the interval covered by area $A+$ in FIGURE 2 only by the impedance of the voltage divider transformer.

Since the impedance of the voltage divider transformer is very low, it will, therefore, conduct load current. In actuality, when the current from point $z+$ through diode 19 is reduced to zero, the D-C voltage will have been increased by one-half the voltseconds of area $\phi_{A+}$, thereby increasing the D-C voltage by this amount and, therefore, increasing the load curent proportionately to a value greater than would have occurred if this phenomenon did not take place.

Accordingly, when the apparently logical circuit of FIGURE 1 is used, the voltage transformers will carry load current to render the circuit substantially inoperative.

In accordance with the present invention, applicant has recognized the need for connecting the primary wniding of the voltage dividing transformer between the phase control reactors and the first diodes of the arms. This apparently would normally necessitate more than one voltage divider transformer which is to be avoided because of the expense of the voltage divider transformers.

In accordance with the invention, however, applicant provides a novel circuit for the voltage divider transformer which cuts out of the sinusoidal voltage applied to the primary of the voltage divider transformer the same amount of voltseconds absorbed by the phase control reactors.

FIGURE 5 shows a first embodiment of the invention for a delta-connected voltage divider transformer. Referring now to FIGURE 5, those components identical to the components of FIGURE 1 have been given identical identifying numerals.

More particularly, in FIGURE 5, the connection between transformer 10 and primary winding 30 is taken through auxiliary windings of reactors 40 through 45. Thus, reactors 40 through 45 are provided with auxiliary windings 60 through 65 respectively. The polarity relationship of the two windings of each reactor are illustrated in the standard manner by the dots representing the starts of each winding. Phase A of transformer 10 is then connected to the corresponding phase A of voltage divider primary winding 30 through auxiliary windings 60 and 61 of reactors 40 and 41. In a similar maner, phases B of the two transformers have auxiliary windings 62 and 63 interposed therebetween, while phases C are connected with auxiliary windings 64 and 65 interposed therebetween.

This novel connection will clearly act in such a manner as to remove from the sinusoidal voltage applied to winding 30 from winding 10 the same voltseconds which are absorbed by the phase control reactors interposed in the connection. Accordingly, a circuit such as that described in FIGURE 1 cannot be formed which will pass load current through the secondary windings 31 and 32 of the voltage balance dividing transformer.

While FIGURE 5 illustrates the novel connection of the invention for a closed delta-connected primary winding 30, it is often desirable to connect the auxiliary windings of the reactors inside of the delta connection.

Thus, as illustrated in FIGURE 6, the voltage divider transformer can be formed by primary windings 70, 71 and 72 having respective secondary windings 73 and 74. The phases A, B and C coming from the main power transformer are then connected to primary windings 70, 71 and 72 in the manner illustrated, whereby again the sinusoidal voltage applied to primary windings 70 through 72 will have removed therefrom those portions occurring during the unsaturated intervals of the various control reactors, as described for FIGURE 5.

Although this invention has been described with respect to its preferred embodiments, it should be understood that many variations and modifications will now be obvious to those skilled in the art, and it is preferred therefore that the scope of the invention be limited not by the specifiic disclosure herein but only by the appended claims.

The embodiments of the invention in which an exclusive privilege or property is claimed are defined as follows:

1. A rectifier system; said rectifier system including an A-C circuit, a D-C system, at least a first and second series connected diode connected between said A-C circuit and said D-C system, a control reactor in series with said first and second diode, and a voltage balancing transformer; said voltage balancing transformer including a primary winding and at least one secondary winding; said control reactor having an auxiliary winding thereon; said primary winding being connected in series with said A-C circuit and said auxiliary winding; said at least one secondary windnig being connected in series with said first dioode.

2. In a rectifier system comprising an A-C circuit, a D-C circuit, and a full wave bridge connected rectifier connected between said A-C and D-C systems; said full wave bridge connected rectifier including at least a first and second series connected diode in each of the arms thereof and a self-saturating control reactor connected in series with each of the arms thereof; a voltage divider transformer having a primary winding and at least a first and second secondary winding; said first secondary winding being connected in series with said first diodes of the positive arms of said full wave bridge connected rectifier; said second secondary winding being connected in series with said first diodes of the negative arms of said full wave bridge connected rectifier; said self-saturating control reactors having auxiliary windings thereon; said primary winding being connected in series with said A-C circuit and said auxiliary windings.

3. The device substantially as set forth in claim 2 wherein said A-C circuit, said voltage divider transformer and said full wave bridge connected rectifier are multi-phase.

4. In combination, a full wave bridge connected rectifier having a plurality of series connected diodes in each arm thereof, a voltage divider transformer having a primary winding and a plurality of secondary windings, and a self-saturable control reactor connected in each arm of said full wave bridge connected rectifier, and an A-C source for said rectifier and said primary winding of said voltage divider transformer; a respective winding of said plurality of secondary windings being connected in series with at least one of the diodes of said plurality of diodes in a respective arm of said full wave rectifier bridge; and electrical circuit means connecting said A-C source to said primary winding including said self-saturable control reactors whereby the voltage applied to said primary winding from said A-C source has removed therefrom the voltsecond area corresponding to the voltsecond area absorbed by said self-saturable control reactors when said self-saturable control reactors are unsaturated.

References Cited
UNITED STATES PATENTS

| | | | |
|---|---|---|---|
| 2,932,781 | 4/1960 | Jensen | 321—27 X |
| 2,994,028 | 7/1961 | Dortort | 321—27 |
| 3,018,380 | 1/1962 | Bright et al. | 321—27 X |
| 3,042,849 | 7/1962 | Dortort | 321—27 |
| 3,170,106 | 2/1965 | Rosenstein | 321—27 X |

JOHN F. COUCH, *Primary Examiner.*

G. GOLDBERG, *Assistant Examiner.*